United States Patent [19]
Wright

[11] 3,753,448
[45] Aug. 21, 1973

[54] VALVE ASSEMBLY FOR WATER FOUNTAINS AND THE LIKE
[75] Inventor: Allen C. Wright, Berkeley, Calif.
[73] Assignee: Haws Drinking Faucet Company, Berkeley, Calif.
[22] Filed: Dec. 7, 1971
[21] Appl. No.: 205,688

Related U.S. Application Data
[62] Division of Ser. No. 875,873, Nov. 12, 1969, Pat. No. 3,709,254.

[52] U.S. Cl.................. 137/609, 251/339, 251/352
[51] Int. Cl........................................... F16k 11/14
[58] Field of Search...................... 137/609, 614.17, 137/614.18, 454.5, 454.6, 454.2, 454.4, 608

[56] References Cited
UNITED STATES PATENTS

| | | | |
|---|---|---|---|
| 3,171,437 | 3/1965 | Suechting, Jr. | 137/609 |
| 3,045,697 | 7/1962 | Seguenot | 137/609 |
| 3,473,551 | 10/1969 | Murauskas | 251/288 X |
| 2,968,315 | 1/1961 | Fisher | 137/454.2 X |
| 3,173,444 | 3/1965 | Bucknell et al. | 137/454.6 |
| 3,576,194 | 4/1971 | Christensen | 137/614.17 X |
| 2,822,818 | 2/1958 | Breznick | 137/454.6 |
| 3,575,209 | 4/1971 | Kast | 137/609 |

Primary Examiner—Samuel Scott
Attorney—Joseph B. Gardner

[57] ABSTRACT

A valve assembly for controlling the flow of water to the discharge nozzle of water fountains and the like. The valve assembly is characterized by providing a complete change from fully closed to fully open position with a very small displacement of the movable control component of the valve assembly, and such control component is isolated from unbalanced pressure forces and, therefore, can be displaced with substantially the same mechanical force irrespective of the pressure of the supply water delivered to the fountain. Further, delay or lag can be introduced into the valve assembly so that opening, or closing, thereof will not be initiated until the movable component of the assembly has been displaced through some predetermined distance. The valve assembly includes a casing defining a pressurizable chamber having an inlet passage in continuous communication therewith and an outlet port selectively opened and closed by a generally spherical valve in accordance with whether the movable control component of the assembly is in its open or closed position. The valve tends to be carried into closing engagement with the outlet port by the discharge of water therethrough, and it also tends to be sealingly related to such port because of the pressure differential developed across the valve when it is once in engagement with the port.

10 Claims, 12 Drawing Figures

PATENTED AUG 21 1973 3,753,448

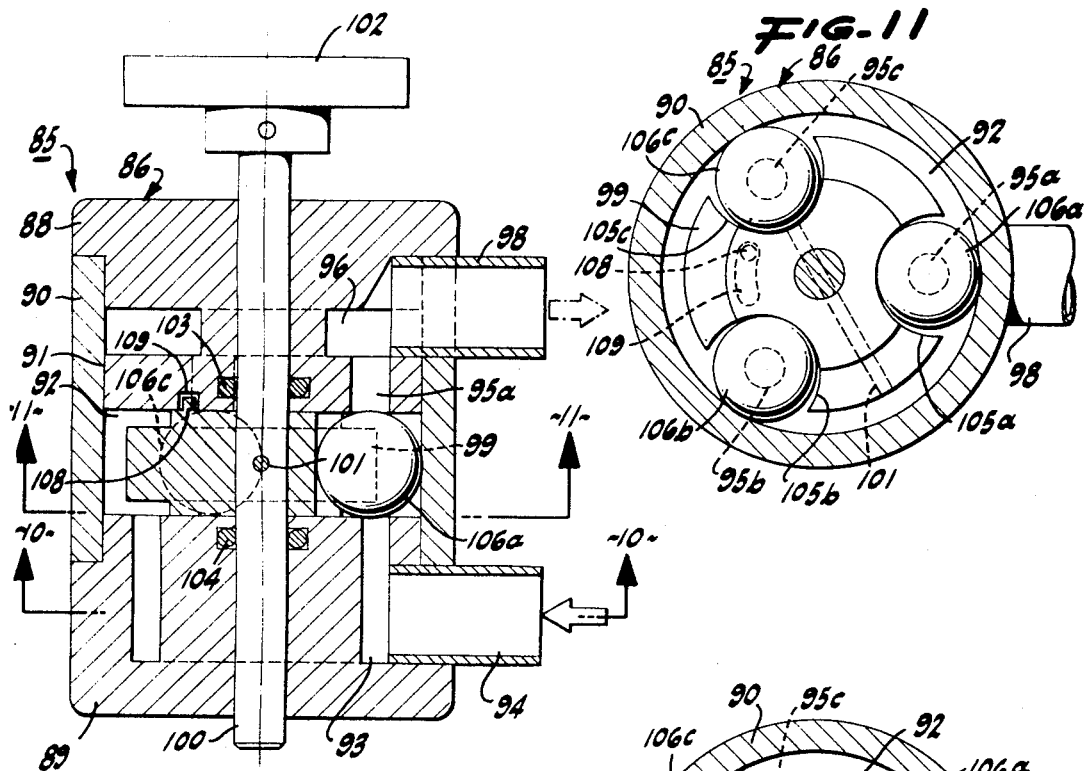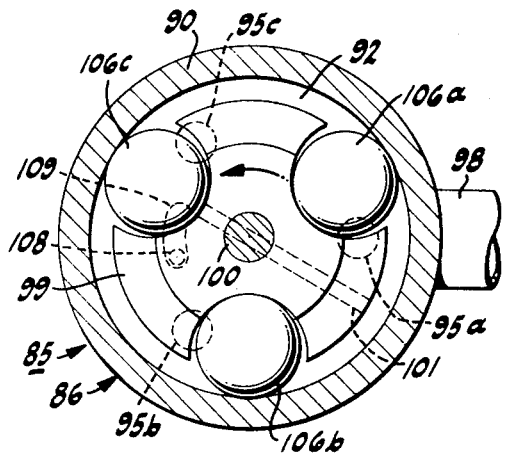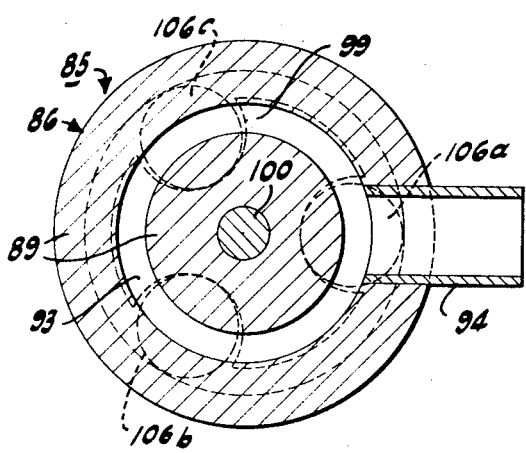

VALVE ASSEMBLY FOR WATER FOUNTAINS AND THE LIKE

RELATED APPLICATION

This application is a division of my copending patent application Ser. No. 875,873, filed Nov. 12, 1969, now U.S. Pat. No. 3,709,254, Jan. 9, 1973.

This invention relates to a valve assembly for controlling liquid flow and, more particularly, to a valve assembly especially useful in controlling the flow of water to the discharge nozzle of water fountains and the like as, for example, eyewash fountains and drinking fountains.

In many environments, it would be desirable to have a valve assembly that could be changed from the completely closed to the completely open position thereof by a very small displacement of its movable control element. In the same or in other environments it would be desirable in certain instances to introduce a time delay or lag between the instant at which the valve assembly tends to initiate the flow of liquid therethrough and the instant at which the movable component of the valve assembly begins to be initially displaced toward the open position thereof. These two features may or may not be combined in any particular valve assembly, but when combined the slight displacement of the movable component required to fully open the valve assembly is measured from the expiration of the time delay. An eyewash fountain of the type used in industry, in various other commercial environments, and in laboratories to provide personnel with a ready means to flush contaminants, foreign particles and other irritants from their eyes is an example of a particular use for valve assemblies embodying the present invention.

Control valves for water fountains and the like are also often difficult to operate because the amount of force required to displace the movable component of the valve assembly from its normally closed position into the open position thereof depends upon the pressure of the water being supplied to the fountain. Supply pressure varies considerably from community to community and, for example, in some areas the supply line pressure may be of the order of 20 psig while in other locations it may be of the order of 100 psig. Accordingly, if the movable component of the valve assembly must operate against the supply line pressure, the magnitude of the force necessary to open the valve will be significantly greater in locales where the supply line pressure is higher than in those communities wherein the supply line pressure is quite low. Also, in any one locality the supply line pressure may vary considerably throughout the day depending upon the overall demand being made upon the water system at any particular time.

An object, among others, of the present invention is to provide an improved valve assembly of the type used to control the flow of liquids and especially the flow of water to water fountains and the like. Another object of the invention is in the provision of an improved valve assembly having a control element selectively movable between open and closed positions, and which control element is substantially isolated from the pressure force of the liquid being controlled by the valve assembly so that the force required to move the control element from closed to open position is essentially independent of the magnitude of the pressure of the liquid being delivered to the valve assembly.

Still another object is that of providing an improved valve assembly of the type described that is completely opened by a very small or limited displacement of the movable control component thereof. Yet another object is to provide a valve assembly in which a delay or lag can be provided between the time in which displacement of the movable control element of the assembly is initiated and the time at which the assembly commences to be opened by such displacement of the control component (such delay or lag can be introduced in the reverse sense or upon displacement of the control component of the valve assembly from the fully open toward the closed position thereof).

A further object is in the provision of an improved valve assembly of the type described that utilizes the flow characteristic of the liquid moving through the open valve assembly for seating the valve component thereof in its closed position, and that then utilizes the continuous delivery of liquid to the valve chamber of the assembly for maintaining the valve component thereof in its closed position. Yet a further object is that of providing a valve assembly as explained that utilizes the pressure of the liquid being supplied thereto to sealingly relate the movable control element thereof to the stationary components of the assembly, thereby automatically compensating for any wear to which the valve assembly is subjected.

Additional objects and advantages of the invention, especially as concerns particular features and characteristics, thereof, will become apparent as the specification develops.

Embodiments of the invention are illustrated in the accompanying drawings in which:

FIG. 9 is a longitudinal sectional view of a still further modified valve assembly;

FIG. 10 is a transverse sectional view taken along the line 10—10 of FIG. 9;

FIG. 11 is a transverse sectional view taken along the line 11—11 of FIG. 9 showing the valve assembly in its closed position; and FIG. 12 is a transverse sectional view similar to that of FIG. 11 but illustrating the valve assembly in its open position.

Figure 1:
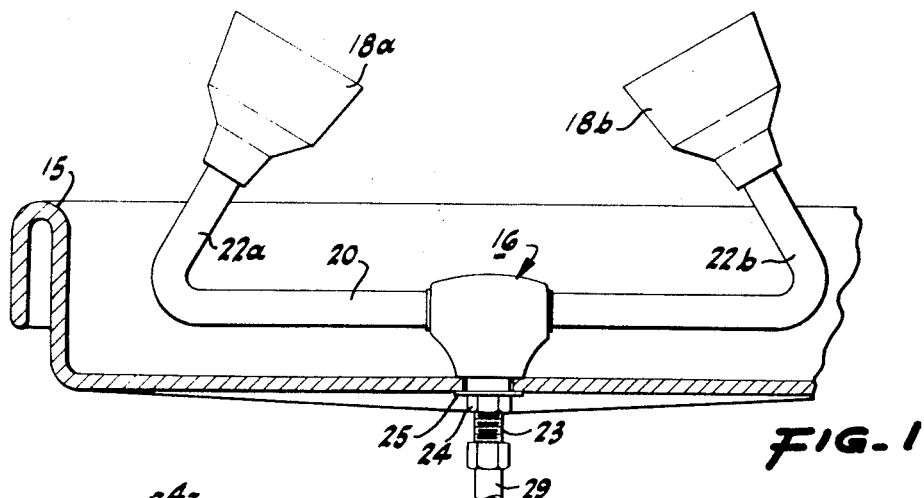
FIG. 1 is a broken longitudinal sectional view of an eyewash fountain having a valve assembly embodying the invention.

As indicated hereinbefore, valve assemblies embodying the present invention are useful in a considerable number of environments and offer the advantages of having the movable control component thereof isolated from unbalanced pressure forces so that such control component is displaceable between the open and closed positions thereof with substantially the same manual force irrespective of the pressure of the water supply delivered thereto, and of having substantially any desired relationship between the magnitude of the displacement of the control component and displacement of the valve element as a consequence thereof. Combined with this latter feature, or independent thereof, is the characteristic of enabling the valve assembly to be completely opened with a very small displacement of the control component. A typifying environment for the invention is illustrated in FIG. 1 in which the valve assembly is shown in association with an eyewash fountain of the type disclosed, for example, in my copending patent application Ser. No. 808,843, filed Mar. 20, 1969 and entitled SPRAY NOZZLE FOR AN EYEWASH FOUNTAIN.

The eyewash fountain illustrated includes a bowl 15 of any conventional form which along the bottom wall thereof will be provided with a discharge port or outlet, not shown, adapted to be connected to waste. Centrally the bottom wall of the bowl 15 is equipped with a valve assembly denoted in its entirety with the numeral 16, and such valve assembly controls the discharge of water to nozzles or heads 17 and 18 through which a soft featherlike flow of water is adapted to be directed into the eyes of a workman to flood the same and wash contaminants, foreign particles, and other irritants therefrom.

The valve assembly 16 includes a valve casing 19, control mechanism including a control component 20 and one or more valve elements 21 (there being two such elements in the valve assembly being considered and the suffixes "a" and "b" are used to differentiate therebetween), and actuating mechanism which in the form shown includes the nozzles 18a and 18b and upwardly and inwardly converging end portions 22a and 22b of the control component 20. The valve casing 19 is ordinarily supported along the bottom wall of the bowl 15 so as to be rigidly related thereto, and in the valve assembly shown, the lower end portion of the casing 19 is threaded externally as shown at 23 and extends through an opening provided therefor in the bottom wall of the bowl. The assembly is fixedly secured to the bowl by means of a nut 24 received upon the threads 23 of the casing and tightened against the underside of the bowl through a washer 25. The casing 19 is provided with an annular shoulder 26 that seats upon the upper surface of the bottom wall of the bowl and is tightened downwardly thereagainst by the nut 24.

The threaded lower end portion 23 of the valve casing 19 is provided with a supply passage 28 therethrough adapted to be furnished with liquid under pressure via a supply conduit 29 that communicates with a source of such liquid as, for example, a water supply line. The passage 28 discharges into a supply chamber 30 that opens into a large pressurizable chamber 31 defined by the valve casing 19. As respects such flow connection of the chambers 30 and 31, the latter is of general symmetrical configuration, as shown best in FIGS. 4 and 5, and it extends axially relative to the longitudinal axis of the elongated control component 20. However, adjacent each longitudinal end thereof the chamber 31 enlarges slightly and has a somewhat eight-shaped form so as to provide two valve chambers or sections 32a and 32b respectively associated with and having the valves 21a and 21b located therein. The supply chamber 30 converges upwardly and inwardly along central walls 33a and 33b which are arcuate and along their inner surfaces define closure wall portions of the valve chambers or sections 32a and 32b. The walls 33 are open at the upper ends thereof to form inlets 34a and 34b through which liquid within the supply chamber 30 spills directly into the sections 32.

The control component 20 is an elongated longitudinally extending flow conduit having a passage 35 extending therethrough that at its opposite ends communicates with the nozzles 18a and 18b so as to supply liquid thereto. The control component 20 extends longitudinally through the pressurizable chamber 31 and is angularly displaceable with respect thereto but is confined against longitudinal displacements by snap rings 36a and 36b respectively seating within circumferential channels provided therefor in the control component 20. Leakage of fluid along the control component 20 is prevented by 0-ring seals 38a and 38b that may be located as shown in FIG. 2.

The pressurizable chamber 31 is also provided with outlet ports 39a and 39b respectively associated and communicating with the chamber sections 32a and 32b. In the valve assembly 16 shown in FIGS. 1 through 4, such outlet ports 39 are formed in the control component 20 and are therefore movable with such control component between the closed position thereof shown in FIGS. 2, 3, and 4, and its open position illustrated in FIG. 5. In such closed position of the control component 20 the valves 21a and 21b sealingly engage the ports 39a and 39b so as to close the same and thereby prevent egress of liquid therethrough from the pressurizable chamber 31 into the passage 35 of the control component.

Figure 2:
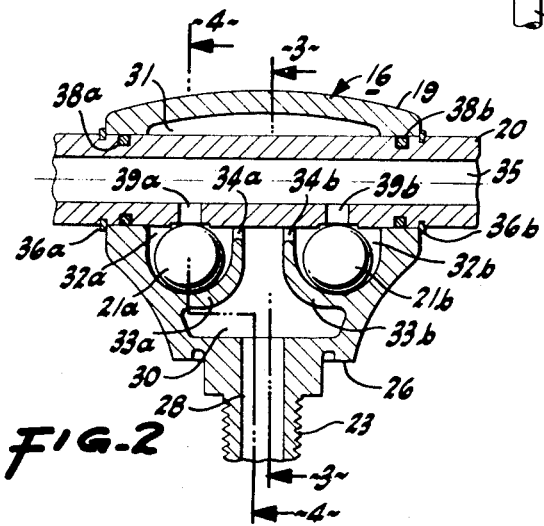
FIG. 2 is an enlarged vertical sectional view through the valve assembly.
Figure 3:
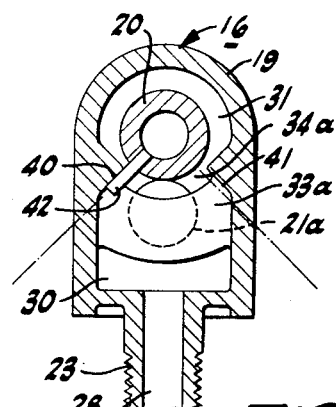
FIG. 3 is a transverse sectional view taken along the line 3—3 of FIG. 2.
Figure 4:
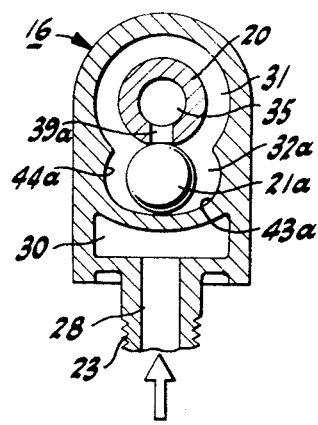
FIG. 4 is a broken transverse sectional view taken along the line 4—4 of FIG. 2 showing the valve assembly in its closed position.
Figure 5:
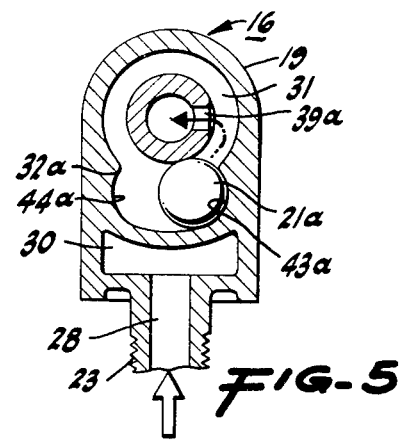
FIG. 5 is a transverse sectional view similar to that of FIG. 4 but showing the valve assembly in the open position thereof.

It will be observed in FIGS. 2 and 4 that the valve chambers or chamber sections 32 are somewhat larger than the valves 21 so that the valves tend to float freely within the chamber sections and are movable therewithin as is evident by comparing FIGS. 4 and 5. When the valves 21 are in sealing engagement with the ports 39, they tend to be fixedly maintained in such position by the pressure differential represented between the low value essentially atmospheric pressure within the passage 35 and ports 39a and 39b and the much higher-value pressure within the chamber 31 which has a value substantially equal to the supply pressure of the liquid being delivered to the supply passage 28 via the supply conduit 29. Irrespective of its particular value, such supply line pressure will be considerably greater than atmospheric pressure and, by way of example, in ordinary cases may range between 20 and 100 psig depending upon the particular community in which the valve assembly is being used. Thus, the valves 21 tend to remain seated in closing relation with the ports 39 as the control component 20 is displaced angularly between the closed position shown in the FIGS. 3 and 4 and the open position shown in FIG. 5 until some obstruction dislodges or unseats the valves from the outlet ports 39.

However, when once unseated from the ports 39, the valves 21 tend to seat thereagainst automatically because of the directional movement of the liquid through the pressurizable chamber 31 toward the discharged ports 39. Such movement of the liquid carries the valves therewith unless some obstruction prevents the same, as shown in FIG. 5. In this respect, the permissible angular displacement of the control component 20 approximates 20°, as is best seen in FIG. 3, being defined by the spaced apart stops or abutments 40 and 41 formed by the casing 19 adjacent the respective transverse extremities of the supply chamber 30. Such abutments 40 and 41 are adapted to be engaged by a stop pin 42 carried by the control component 20 and selectively engageable with the abutments which respectively define the closed and open positions of the valve assembly.

The angular displacement afforded for each of the valves 21 is less than 90°, and in comparing FIGS. 4 and 5 it will be seen that the displacement of the valves is of the order of 20°. Such limitation on the angular displacement of the valves 21 is established by the transverse end walls 43 of the valve chambers 32. It might be noted that the control component 20 is angularly displaceable in a counterclockwise direction as viewed in FIG. 3 from its closed into its open position, and such movement is effected as viewed in FIG. 1 by moving the nozzles 18 forwardly. Thus, the eyewash fountain and bowl 15 thereof may be placed along a vertical wall since no water will discharge from the nozzles 18 until they have been displaced forwardly by some predetermined angular distance which in the specific structure being considered is a displacement somewhat in excess of about 20°.

Should it be desirable in certain installations to have the control element 20 move in the opposite direction in order to open the valve assembly, it is readily accomplished by placing the stop pin 42 in engagement with the abutment 41 when the valve is closed and such placement of the stop pin can be effected by forming a recess in the control element 20 in substantial alignment with the abutment 41 and into which the stop pin can be inserted or by inverting the control component 20 end for end so that the discharge nozzle 18b would occupy the position of the nozzle 18a as illustrated in FIG. 1. In either case, the valves 21 sould be displaced or unseated upon movement of the control component 20 by abutment with the transverse end walls 44 of the valve chambers 32. The surfaces of the control element 20 (which is substantially cylindrical) about the ports 39 along the edges thereof adapted to be sealingly engaged by the valves 21 are flatened, as shown best in FIG. 2, so that the bottom edge of each port 39 defines a plane of circular configuration adapted to be sealingly engaged by the valves 21.

In use of the valve assembly 16 it is arranged with a bowl 15 as hereinbefore described and connected with a supply line 29 so that when the valve assembly is opened, liquid will be discharged through the nozzles 18. Ordinarily, the valve assembly 16 is closed in which case the stop pin 42 is in engagement with the abutment 40, and for an eyewash fountain the nozzles 18 at this time may have a generally vertical orientation as shown in FIG. 1. Water is continuously supplied to the pressurizable chamber 31 whereupon the valves 21 are sealingly seated against the respectively associated ports 39 so that no water is delivered therethrough to the passage 35 of the control element 20. When a workman has need to use the eyewash fountain to bath his eyes, he simply grasps one or both of the nozzles 18 or upwardly turned end portions 22 of the control element and pulls the nozzles forwardly whereupon the water commences to discharge from the nozzles in the usual manner.

As explained hereinbefore such angular displacement in a forward direction of the nozzles 18 causes the valves 21 to be unseated from the outlet ports 39 whereupon the water in the pressurizable chamber 31 flows freely through the outlet ports 39 and into the passage 35 for discharge from the nozzles 18. Discharge through the nozzles 18 is terminated simply by displacing the nozzles in the opposite angular direction, and as soon as the outlet ports 39 come into approximate alignment with the chambers 32, the valves 21 are carried by the flow or movement of water toward the outlet ports and seat thereagainst to close the same. It should be noted that such closing of the ports occurs irrespective of the location of the valves 21 within the chambers 32 when the ports 39 are moved into alignment with the chambers because it is the water movement that carries the valves into seating engagement with the ports. Therefore, it is not essential that the valves 21 remain in engagement with the walls 43, and as respects the closing function the valves can actually be in engagement with the walls 44 at the time the control element is returned to its closed position and the valves will nevertheless be carried into seating engagement with the ports 39.

Any desired lag may be introduced into the assembly to provide a suitable delay between displacement of the control element 20 and point along such displacement at which the valves 21 unseat. As stated heretofore, the delay in the specific structure being considered is of the order of 20°, but should a greater delay be desired the chambers 32 are simply elongated so as to move the abutment wall 43 of each chamber a greater angular distance in a counterclockwise direction (as viewed in FIGS. 3–5) from the vertical center of the assembly. On the other hand should less delay or substantially no delay be desired, the abutment walls 43 of the valve chambers would simply be moved in an opposite direction or in a clockwise direction as viewed in these figures so that the valve 21 would be unseated almost immediately upon any angular displacement of the control component 20.

It should be also be noted that once the period of delay is passed, the valve assembly is completely opened by very little angular displacement of the control component 20, and such angular displacement in the form shown is simply the distance equivalent to the width of the port 39 or about 25° in the structure shown. Thus, the remaining angular displacement afforded for the control component 20 in excess of the delay displacement of about 20° and the opening displacement of about 20° (such remaining displacement being substantially equal to 55° — i.e., 90° minus 20° minus 20°) simply permits a workman to adjust the angular position of the nozzles 18 to best suit his convenience.

In the embodiment of the invention shown in FIGS. 1 through 5, the valve assembly 16 is conditioned either to deliver water to the nozzles 18 or to prevent such delivery thereto by angular displacement of the control component 20 between open and closed positions. Additionally, a plurality of valves are included in the assembly, and it also requires manual displacement of the control component 20 both to open the valve assembly and to close the same. It might also be noted that the outlet ports 39 are provided by the control component so that such ports move therewith.

Figure 6:
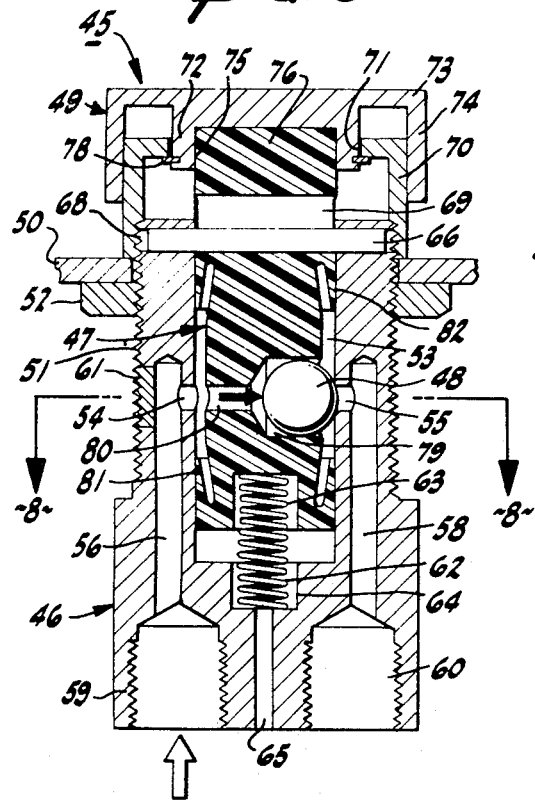
FIG. 6 is an axial sectional view of a modified valve assembly embodying the invention showing the assembly in the closed position thereof.
Figure 7:
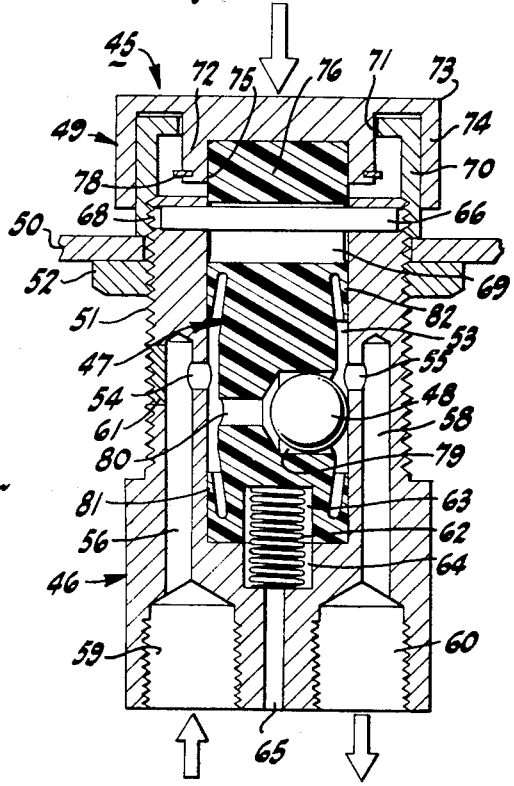
FIG. 7 is an axial sectional view similar to that of FIG. 6 but showing the valve assembly in its open position.
Figure 8:
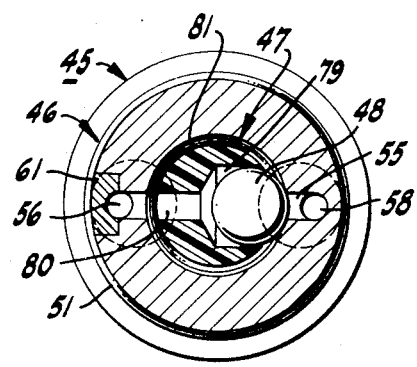
FIG. 8 is a transverse sectional view taken along the line 8—8 of FIG. 6.

The modified embodiment of the invention illustrated in FIGS. 6 through 8 departs from the valve assembly characteristics described in that the control component is axially displaceable rather than being angularly displaceable, it is resiliently biased toward the closed position thereof so that manual effort is required only to open the assembly, only one valve component is provided by the assembly, and the outlet port is formed in the valve casing and is therefore stationary as respects axial displacements of the control component. However, the valve element that closes such outlet port is carried by the control member and is consequently movable therewith between the outlet-covering closed position and outlet-uncovering open position.

The modified valve assembly shown in FIGS. 6 through 8 is denoted in its entirety with the numeral 45 and it includes a valve casing 46, control mechanism including a piston or control component 47, a valve element 48, and push button or actuating mechanism 49. The valve casing 46 is ordinarily supported upon a drinking fountain or the like so as to be rigidly related thereto, and the control mechanism comprising the control component 47 is selectively movable relative to the casing between the upper closed position shown in FIG. 6 and the lower open position illustrated in FIG. 7 upon suitable manual manipulation of the push button mechanism 49. Any conventional means may be employed to fixedly secure the valve assembly 45 to such fountain, and as shown in the drawings a typical mounting may include an opening in a wall 50 of such fountain and through which the threaded upper end portion 51 of the casing 46 projects, and which wall 50 is abutted along the upper side thereof by the push button mechanism 49 and along its underside by a nut 52.

The casing 46 is equipped with an axially extending cylinder 53 defining a pressurizable chamber within which the control component 47 is axially reciprocable. The casing is also provided with an inlet passage 54 communicating with the chamber 53 and with an outlet port 55 also communicating therewith. The passage 54 and port 55 are angularly spaced by approximately 180° and are located at about the same axial position along the chamber 53. The passage 54 and port 55 respectively communicate with axially extending bores or passageways 56 and 58 which may be enlarged and threaded at their outer extremities as shown at 59 and 60 so as to enable outlet and inlet conduits (not shown) to be respectively secured thereto. A closure plug 61 seals the work opening in the casing 46 used to form the passage 54 and port 55 therein.

The piston or control component 47 is biased upwardly into the closed position thereof shown in FIG. 6 by a helical compression spring 62 that at its upper end seats within a recess 63 provided therefor in the under surface of the control component 47 and at its lower end seats within an axially extending passage 64 formed within the casing 46. The lower end portion of the cylinder or chamber 53 below the control component 47 opens to atmosphere through a vent passage 65.

Upward displacement of the control component 47 under the biasing force of the spring 62 is limited by a transversely disposed pin 66 that extends through a transverse bore or passage 68 provided therefor in the casing 46 adjacent the upper end thereof, and which pin extends also through an axially elongated recess 69 formed within the piston or control component 47 in the upper end portion thereof. The pin 66 is confined within the bore 68 against axial displacements with respect thereto so that engagement of the bottom closure wall of the recess 69 with the pin 66 defines the maximum permissible upward displacement of the control component 47.

The push button mechanism 49 as respects the present invention may take any convenient form, and the typical mechanism shown includes a mounting member 70 of generally cylindrical configuration that is internally threaded so as to receive and engage the external threads provided by the upper end portion 51 of the casing 46. The mounting member 70 has a large central opening 71 therethrough that telescopically receives a central depending boss 72 provided by a push button 73 which is also of cylindrical configuration and has a depending skirt 74 that telescopically receives the member 70 therewithin. The boss 72 has a large central recess 75 receiving the upper end portion 76 of the control component 47 therein, and a snap ring 78 seated within an annular channel provided therefor in the boss 72 underlies the top wall of the mounting member 70 so as to prevent separation of the push button 73 from the mounting member. Various arrangements may be used to unite the push button mechanism 49 with the valve casing 46 other than the arrangement illustrated such as the tamper proof arrangement disclosed in my copending patent application Ser. No. 780,839, filed Dec. 3, 1968, and entitled WATER BUBBLER ASSEMBLY.

The control component 47 is provided intermediate the ends thereof and along one side with a valve chamber 79 that is generally cylindrical as is evident by comparing FIGS. 6 and 8, and the chamber seats the valve element 48 therein. At its inner end, the valve chamber 79 is connected by a passageway 80 with the pressurizable chamber 53 so as to be in continuous communication therewith. It will be noted that the valve chamber 79 and passageway 80 are transversely oriented and extend generally between the passage 54 and outlet port 55. In this respect, it will be appreciated that the pin 66 extending through the recess 69 maintains the control component 47 in the particular orientation illustrated in the drawings so that the valve chamber 79 is in substantial alignment with the discharge or outlet port 55. Thus, the control component 47 is constrained against angular displacements but is free to reciprocate axially within the pressurizable chamber 53.

The control component 47 is provided at spaced apart locations with inwardly facing cup-type seals 81 and 82 that are urged radially outwardly into slidable sealing engagement with the circumjacent walls of the pressurizable chamber 53 by the fluid pressure active therein so that there is substantially no leakage of liquid along the control component. Thus, the pressure of the liquid being supplied to the valve assembly 45 is utilized in preventing leakage in and about the control component 47 since the pressurizable chamber 53 is continuously in open communication with the inlet passage 54, wherefore a pressure force continuously operates against the cup-type seals 81 and 82 tending to urge them radially outwardly and into tight sealing engagement with the circumjacent surface of the chamber 53. Accordingly, the valve assembly is able automatically to accommodate the requirement for increased sealing as supply pressures increase and similarly to accommodate any wear that occurs along the slidably related surfaces of the seals 81 and 82 and walls of the chamber 53 engaged thereby.

The valve 48 tends to sealingly engage the outlet port 55 to prevent the egress of liquid therethrough whenever the control component 47 is in the closed position illustrated in FIG. 6 because of the pressure differential across the valve 48 as explained hereinbefore with reference to the embodiment of the invention illustrated in FIGS. 1 through 5. Also, the valve 48 tends to seek out and close the port 55 whenever the control component 47 is returned to its closed position because of the outward flow or movement through the port 55, all as explained hereinbefore. However, the control component 47 substantially positions the valve 48 in alignment with the outlet port 55 whenever the control component is in its closed position because of the maintenance of the angular orientation of the control component and dimensional relationship of the valve chamber 79 to the valve 48.

The valve assembly 45 is used in the conventional manner by connecting the threaded enlargement 59 to a supply conduit and the threaded enlargement 60 to a nozzle or other discharge device of a water fountain or the like. Ordinarily, the valve assembly is closed because of the positioning of the control component 47 thereof by the helical spring 62 and because of the closure function of the valve 48 with the outlet port 55 as explained. To open the valve and permit the discharge of water through the outlet port 55, passageway 58, and any conduit connected therewith, the push button mechanism 49 is displaced downwardly to unseat the valve 48 from the port 55. Release of the mechanism 49 permits the spring 62 to return the valve assembly to its closed position. It will be evident that very slight axial displacement of the control component 47 completely opens the outlet port 55, and because of the structural relationship shown, such opening occurs almost coincidently with initial downward displacement of the control component. However, any desired delay can be introduced into the assembly as, for example, by increasing the axial dimension of the valve chamber 79 in an upward direction so that the valve 48 will not be unseated until the control component 47 has been displaced downwardly through some predetermined distance.

The further modified embodiment of the invention illustrated in FIGS. 9 through 12 is quite analogous to the embodiment shown in FIGS. 1 through 5 in the sense that angular displacement of a control component causes the valve to be moved between open and closed positions and because a plurality of valves are included in a single assembly. Also, manual manipulation is required to open the valve assembly and also to return it to its closed position, but the valves are displaced from their respectively associated outlet ports by such movement of the control component so that in this respect the assembly is similar to that of FIGS. 6 through 8 in which displacement of the control component 47 carries the valve element 48 therewith.

It might be observed that the use of a plurality of valves in any one assembly is a space saver in that an assembly equipped therewith ordinarily will accommodate a much larger flow of liquid with the same size valve elements and limited displacement of the control component related thereto. Accordingly, in both of the embodiments shown in FIGS. 1 through 5 and in FIGS. 9 through 12, one valve and outlet port can be used wherever this is desired. Similarly, in the embodiment shown in FIGS. 6 through 8 a plurality of valves could be associated with control component 47 and with a plurality of outlet ports in the event that a greater flow of liquid is required.

The modified valve assembly of FIGS. 9 through 12 is designated in its entirety with the numeral 85 and it includes a valve casing 86 comprising an upper outlet component 88 and a lower inlet component 89. The casing components 88 and 89 are separable one from the other and are interconnected and maintained in the position shown in FIG. 9 by a band 90 that surrounds the same in circumjacent relation and seats within a channel 91 defined by the two components when axially connected as shown in the drawings. The band 90 may be secured by any suitable means as, for example, by having the adjacent ends thereof butt welded (not shown). In this instance, the components 88 and 89 could be pressed into the endless band 90 so as to be frictionally constrained thereby and sealingly related thereto.

The casing components 88 and 89 define a pressurizable chamber 92 therebetween that is closed circumfrentially by the band 90. Communicating with the chamber 92 is an inlet passage 93 in the form of an annular supply chamber defined within the lower inlet casing component 89. The inlet passage or supply chamber 93 is adapted to be connected to a supply of liquid by a fitting or short inlet conduit 94, and as in the embodiments of the invention hereinbefore described, the pressurizable chamber 92 is continuously supplied with liquid through the inlet 94 and annular chamber or supply passage 93.

A plurality of outlet ports 95 communicate with the pressurizable chamber 92 so as to enable liquid to be discharged therefrom, and in the particular valve assembly being considered there are three such ports respectively denoted with the numerals 95a and 95b and 95c. Each of the ports 95 opens into an annular discharge chamber 96 defined by the upper discharge component 88 of the valve casing, and the chamber 96 communicates with a discharge conduit or fitting 98 adapted to be connected with the discharge nozzle of a water fountain or other utilization mechanism.

Associated with the valve casing 86 and forming a part of the valve assembly 85 is control mechanism that includes a control component 99 mounted within the pressurizable chamber 92 and angularly displaceable with respect thereto. The control component is supported within the chamber 92 for such angular displacement by a stem 100 extending axially through the casing 86 and through the control component 99. The stem 100 is attached to the control component 99 so as to prevent relative angular displacements therebetween by a pin 101. The stem 100 projects beyond the upper casing component 88 and is equipped thereat with a knob 102 pinned or otherwise secured to the stem so as to enable manual rotation of the knob 102 to angularly displace the stem 100 and control component 99 attached thereto. The stem 100 may be sealingly related to the casing components 88 and 89 by O-ring seals 103 and 104.

The control component 99 has three recesses or chambers formed therein which are equally spaced in an angular sense and are referenced to the outlet ports 95 so as to be aligned therewith when the valve assembly is in the closed position thereof shown in FIG. 11.

For identification, such valve chambers or recesses are respectively denoted with the numerals 105a, 105b, and 105c. Respectively seated within the recesses 105 are a plurality of valve elements respectively denoted with the numerals 106a, 106b, and 106c. It will be apparent by comparing FIGS. 11 and 12 that when the control component 99 is displaced angularly in a counterclockwise direction as viewed in these two figures, the valves 106 are displaced from seating engagement with the respectively associated outlet ports 95 so that the valve assembly is then open and liquid is permitted to discharge through the outlet ports, collection chamber 96, and outlet fitting 98. The extent of the permissible angular displacement of the control component 99 is determined by cooperative engagement of a stop pin 108 carried by the control component 99 (and extending upwardly therefrom as shown in FIG. 9) and an angular slot 109 formed within the upper casing component 88 and within which the stop pin 108 is slidably displaceable.

Use of the valve assembly 85 is the same essentially as use of the valve assemblies hereinbefore described, and in this respect the inlet 34 is connected to a suitable source of liquid and the outlet fitting 98 is connected to the discharge nozzle of the fountain or other utilization device. Ordinarily the knob 102, stem 100, and control component 99 are in the closed orientation illustrated in FIG. 11, and when it is desired to open the valve the control knob 102 is simply displaced angularly in a counterclockwise direction as viewed in FIG. 11 to unseat the valves 106 from the outlet ports 95 respectively associated therewith whereupon such ports are in open communication with the pressurizable chamber 92. Although the control component 99 tends to align the valves 106 with the respectively associated ports 95 when the control component is in its closed position, the valves 106 are moved into seating engagement with the discharge or outlet ports because of the movement of liquid therethrough and to sealingly close such ports because of the pressure differential across each valve, all as hereinbefore explained.

Again, the response of the valve is very rapid so that the assembly can be moved into its completely open position by a very small angular displacement of the control knob 102. However, any desired delay may be introduced into the assembly before such opening of the ports 95 occurs by increasing the radial length of each valve chamber or recess 105.

The materials from which the valve assembly is constructed may take various forms and in the usual instance the valve casings will be made from a non-corrosive material such as brass or bronze. The valve elements are relatively lightweight and may be formed of various materials such as natural or synthetic rubber or rubber compositions and, as a specific example, neoprene may be used. It will be apparent that a ball-shaped or generally spherical configuration for the valve elements is advantageous because it eliminates the need to align or position the valve element in a particular orientation to effect proper closing thereof with the outlet port. However, other configurations might be provided including one having flat sides provided that means be incorporated in the valve assembly to maintain proper orientation of the valve element for proper sealing engagement thereof with the outlet port.

The control component of the assembly usually will be metal in the form thereof shown in FIGS. 1 through 5, and it may be entirely or partly of metal or of plastic in the form thereof shown in FIGS. 9 through 12. In that a slidable sealing relationship is required between the control element 47 and the circumjacent walls of the cylinder defining the pressurized chamber 53 in the form of the assembly illustrated in FIGS. 6 through 8, the control component is advantageously formed of a synthetic plastic material such as nylon although a self-lubricating plastic such as teflon may also be used.

Concerning various uses for the valve assembly, it has been indicated hereinbefore that it can have application in a wide variety of environments and it may be observed that the assembly is readily employed as a check valve having means located exteriorly of the valve casing for unseating the valve element to permit flow in the checked or controlled direction (i.e., outwardly from the pressurizable chamber through the outlet ports associated therewith) whenever this is desired. Reverse flow through the outlet port and into the pressurizable chamber is automatically accommodated by the valve element which will be unseated by any such reverse flow through the outlet port.

While in the foregoing specification embodiments of the invention have been described in considerable detail for purposes of making a complete disclosure of the invention, it will be apparent to those skilled in the art that numerous changes may be made in such details without departing from the spirit and its principles of the invention. What is claimed is:

1. A valve assembly for a water fountain or the like, comprising a valve casing defining a pressurizable chamber having an inlet passage communicating therewith to supply liquid under pressure thereto and an outlet port communicating therewith to discharge liquid therefrom, a control component supported by said casing within said chamber for displacements between open and closed positions generally traversing said outlet port, and a valve element carried by said control component within said chamber for displacements relative to said outlet port and being respectively operative in the open and closed positions of said control component to permit and to prevent discharge of liquid from said chamber, said valve element in the closed position of said control component being movable in the direction of liquid flow through said outlet port into sealing engagement therewith as a consequence of the outward flow of liquid therethrough and thereafter being maintained in sealing engagement with said outlet port by the pressure differential then defined across said valve element, displacement of said control component toward the open position thereof being operative to displace said valve element transversely relative to such flow direction and thereby effect relative movement of said valve element and outlet port to open the latter and permit discharge of liquid from said chamber, whereby there are no significant pressure forces operative between said control component and valve casing tending to either implement or inhibit displacements of said control component between the opened and closed positions thereof.

2. The valve assembly of claim 1 in which said control component is provided with a valve chamber in open communication with said pressurizable chamber and defines a flow path extending generally between said inlet passage and output port, said valve element being located within said valve chamber generally along such flow path.

3. The valve assembly of claim 2 in which said inlet passage is in continuous open communication with both said pressurizable and valve chambers, the aforesaid flow path defined by said valve chamber being oriented in substantial flow alignment with said inlet passage.

4. The valve assembly of claim 2 in which said pressurizable chamber is an axially extending cylinder and said element is a piston axially reciprocable therein between its open and closed positions, said valve chamber being located intermediate the ends of said piston, and said piston having inwardly facing cup-type seals opening toward said valve chamber and flow path therethrough, whereby the pressure force adjacent such flow path is operative against said seals to sealingly relate said piston to the circumjacent walls of said cylinder.

5. The valve assembly of claim 2 in which said pressurizable chamber is an axially extending cylinder and said control element is a piston axially reciprocable therein between its open and closed positions, and in which said valve element has a generally spherical configuration.

6. The valve assembly of claim 5 in which said inlet passage and outlet port are angularly spaced about said cylinder, and in which means are provided for constraining said piston against angular displacements with respect to said cylinder so as to maintain said valve element in general alignment with said outlet port.

7. The valve assembly of claim 6 and further comprising a compression spring operative between said valve casing and piston and imparting a biasing force to the latter urging it toward the closed position thereof.

8. The valve assembly of claim 2 in which a plurality of outlet ports are provided at angularly spaced locations about said pressurizable chamber in communication therewith to discharge liquid therefrom, in which a plurality of valve elements are located within said chamber and are carried by said control component in respective association with said outlet ports to selectively open and close the same as aforesaid, in which said control component is supported by said valve casing for angular displacement with respect thereto between its open and closed positions, and in which said control component is provided with a plurality of angularly spaced valve chambers respectively having said valve elements positioned therein so as to be displaceable with said control component relative to said outlet ports.

9. The valve assembly of claim 8 and further comprising stop means cooperative with said control component to limit displacements thereof in opposite angular directions in its fully open and fully closed positions.

10. The valve assembly of claim 9 in which said valve casing is provided with an annular supply chamber defining said inlet passage and being in open communication with said pressurizable chamber, and in which each of said valve elements has a generally spherical configuration.

* * * * *